United States Patent [19]
Kim

[11] Patent Number: 5,865,577
[45] Date of Patent: Feb. 2, 1999

[54] CLAMPING DEVICE FOR WORKING AN ENGINE

[75] Inventor: Byung-Gi Kim, Seoul, Rep. of Korea

[73] Assignee: Hyundai Motor Company, Seoul, Rep. of Korea

[21] Appl. No.: 873,926

[22] Filed: Jun. 12, 1997

[30] Foreign Application Priority Data

Jun. 14, 1996 [KR] Rep. of Korea .................. 1996-21371

[51] Int. Cl.⁶ .................................................. B23Q 3/06
[52] U.S. Cl. ............................ 409/225; 269/32; 451/381
[58] Field of Search .................................... 29/56.6, 56.5;
408/87, 91, 79; 269/290, 900, 909, 296,
289 R, 138, 27, 32, 310, 47, 309, 48.1,
48.3; 409/218, 219, 220, 225; 451/381,
365

[56] References Cited

U.S. PATENT DOCUMENTS

| | | | |
|---|---|---|---|
| 1,982,804 | 12/1934 | Hall ...................................... | 409/225 X |
| 2,424,090 | 7/1947 | Gordinier ................................ | 269/310 |
| 3,598,392 | 8/1971 | Williamson et al. ...................... | 269/27 |
| 3,858,867 | 1/1975 | Claycomb ............................ | 269/310 X |
| 4,688,321 | 8/1987 | Smith .................................. | 409/225 X |
| 5,611,650 | 3/1997 | Perkins et al. ....................... | 409/219 X |

FOREIGN PATENT DOCUMENTS

| | | | |
|---|---|---|---|
| 714960 | 8/1965 | Canada .................................. | 409/220 |
| 5-40908 | 10/1993 | Japan . | |
| 156859 | 8/1963 | U.S.S.R. ................................ | 451/381 |

*Primary Examiner*—William R. Briggs
*Attorney, Agent, or Firm*—Finnegan, Henderson, Farabow, Garrett, & Dunner, L.L.P.

[57] ABSTRACT

A clamping device for milling working of engine is provided which makes stability of working operation by stably fixing without trembling upon milling working of casted engine and improves a working preciseness and prevents deformation of members by dispersing excessive clamping force. The invention comprises: in a clamping device for milling working of engine including a base member, a sub-clamp which is fixed on the base member and supports bottom surface of cylinder block, and a main-clamp fixing by pressing vertically from upward a cylinder block supported by the sub-clamp; an oil pressure cylinder to be mounted to bottom or body's interior of said base member so that a piston rod is reciprocally moved in horizontal direction; a horizontally operating rod for slidably moving in horizontal direction by said piston rod; a vertically operating rod for rising in vertical direction by cooperatively moving therewith upon forwardly moving of said horizontally operating rod; and a push rod for fixing by applying a pressing power to a journal member of said cylinder block by slidably moving in horizontal direction upon rising of said horizontally operating rod by cooperatively moving therewith.

5 Claims, 4 Drawing Sheets

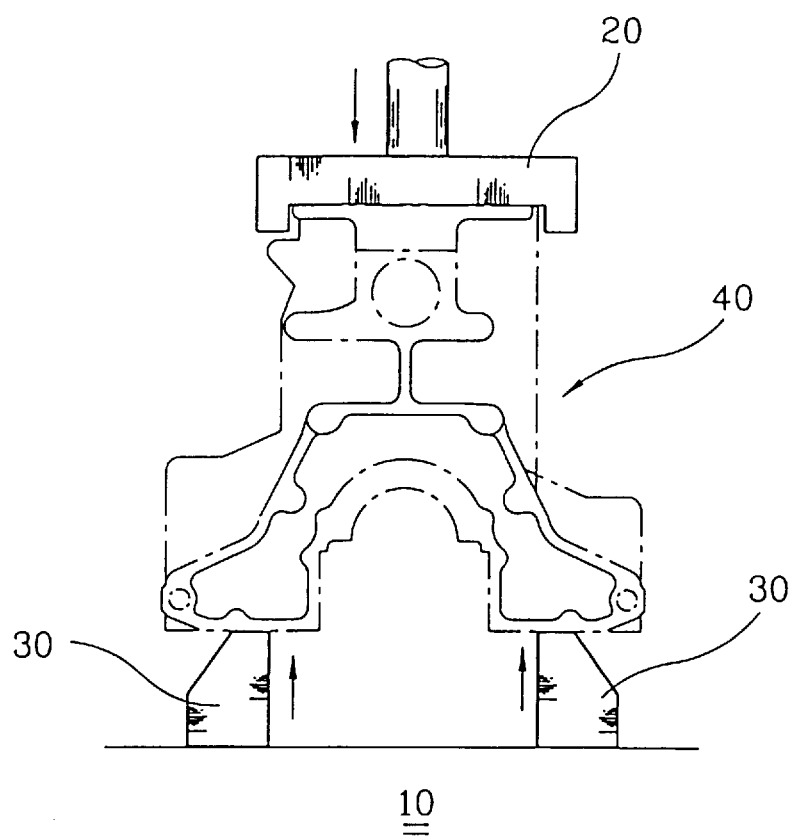

1

CLAMPING DEVICE FOR WORKING AN ENGINE

BACK GROUND OF THE INVENTION

1. Technical Field

The present invention relates to a clamping device for milling working of engine which prevents a movement to thrust direction of cylinder block in a cutting working process for roughly cutting or precisely cutting front and rear surfaces of cylinder block of engine so as to make firm fixation.

2. Prior Art

In general, since the cylinder block of engine is made of cast-iron wear and has a rough surface, a post-working is required, and particularly, in order to roughly cut or precisely cut the front and rear surfaces of cylinder block, the cutting work is done by a milling cutter.

In such a cutting working time, a greatly strong shock is applied to the cylinder block, and in order to firmly fix the cylinder block from such a shock, a clamping device is used.

Heretofore, as a clamping device for fixing the engine, presently a device of system fixing by pushing down the engine from vertical direction is mainly used.

Above-mentioned clamping device fixes the engine 40 by pushing down by a main clamp 20 in a state that an engine is laid on a sub-clamp 30.

However, in accordance with the clamping system as above, since a material is pressed and fixed only from up and down direction, in case of milling cutting working, since a holding power is weak against pressure to both side directions, i.e., thrust direction, in case when a cutting force is largely applied, a problem is pointed out in which the material becomes trembled.

And, when it is fixed by applying a large pressure only from up and down direction, at a time of releasing the clamp after finishing the working, a deformation of material might be caused.

Particularly, since a pressure becoming to be applied upon working the cylinder block 40 is greatly big, when such a instability as material trembling is caused, there would be problem that it brings uneasiness to an operator and also a working preciseness would be decreased.

OBJECT AND SUMMARY OF THE INVENTION

The present invention is offered in order to improve such a problem as above, and it is a primary object of the present invention to provide a clamping device for milling working of engine which makes stable working operation to be executed by stably fixing so as not to have a trembling upon a cutting working of casted cylinder block.

Another object of the present invention is to provide a clamping device for milling working of engine capable of improving a working preciseness by preventing a trembling of engine to be worked.

Still other object of the present invention is to provide a clamping device for milling working of engine for preventing a deformation of member according to excessive clamping force by dispersing a force acting for fixing the engine.

In order to attain the objects as above, the present invention comprises: in a clamping device for milling working of engine including a base member, a sub-clamp which is fixed on the base member and supports bottom surface of cylinder block, and a main-clamp fixing by pressing vertically from upward a cylinder block supported by the sub-clamp, a clamping device for milling working of engine comprising:

an oil pressure cylinder to be mounted to bottom or body's interior of said base member so that a piston rod is reciprocally moved in horizontal direction;

a horizontally operating rod for slidably moving in horizontal direction by sad piston rod;

a vertically operating rod for rising in vertical direction by cooperatively moving therewith upon forwardly moving of said horizontally operating rod; and a push rod for fixing by applying a pressing power to a journal member of said cylinder block by slidably moving in horizontal direction upon rising of said horizontally operating rod by cooperatively moving therewith.

BRIEF DESCRIPTION OF THE DRAWINGS

FIG. 5 is a schematic cross sectional view showing a convectional clamping method of engine.

DETAILED DESCRIPTION OF PREFERRED EMBODIMENTS

Hereinafter, the preferred embodiments of the present invention will be described more in detail with reference to the accompanying drawings.

Figure 1:
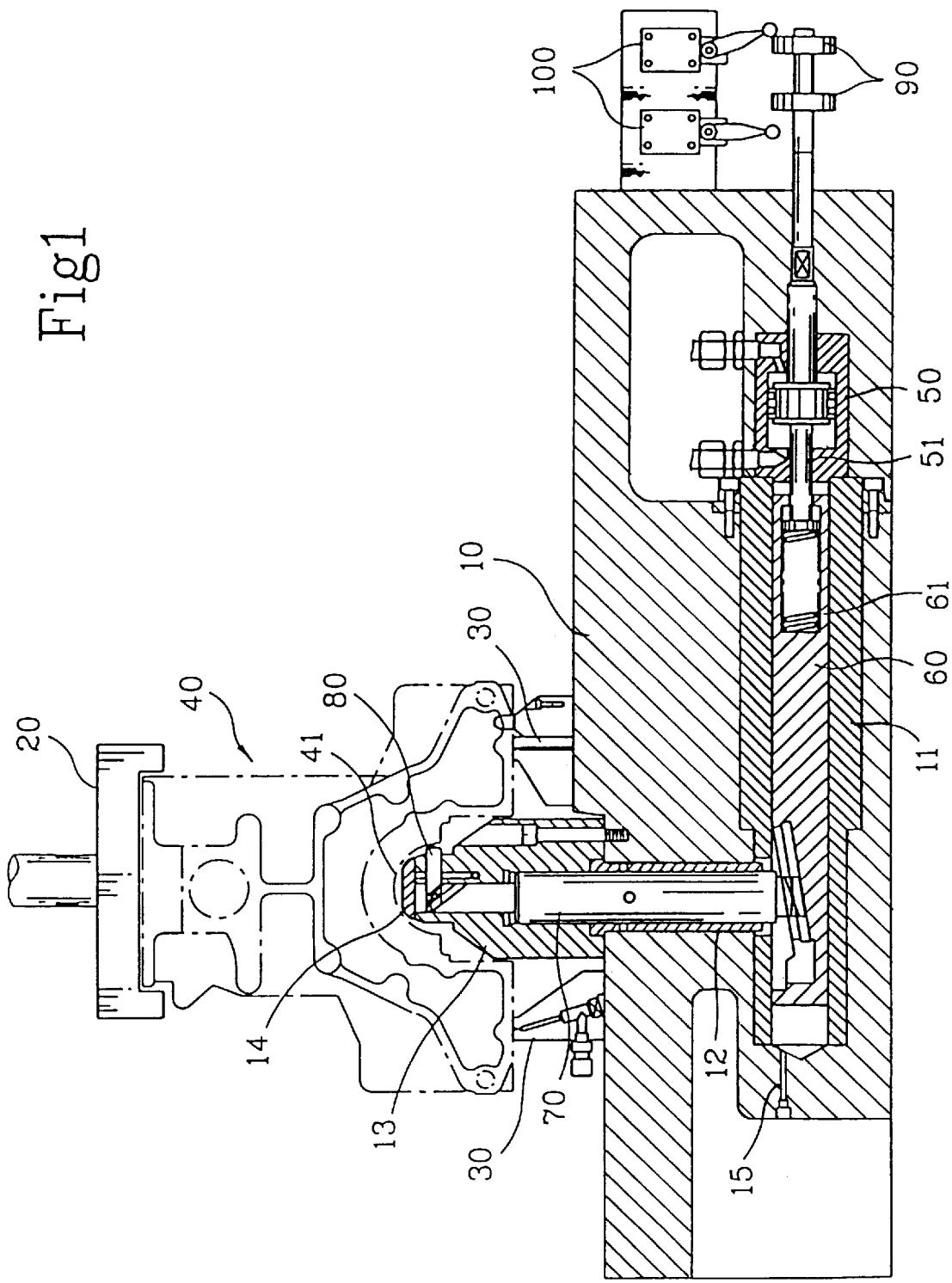
FIG. 1 is a cross sectional view of the clamping device for milling working of engine showing an embodiment of the present invention.

FIG. 1 is a cross sectional view of the clamping device for milling working of engine showing an embodiment of the present invention, and in the drawings, a reference numeral symbol 10 is a base member.

To the base member 10, a sub-clamp 30 for supporting both sides of bottom surface of cylinder block 40 is fixed, and a reference numeral symbol 20 is a main clamp for fixing by vertically pressing down the cylinder block laid on the sub-clamp 30.

An oil pressure cylinder 50 is inserted and mounted to both sides at bottom or within a body of the base member 10, a horizontally operating rod 60 for slidably reciprocating in horizontal direction in cooperation with a piston rod 51 reciprocating by an operation of the oil pressure cylinder 50 is provided at its front-ward, a vertically operating rod 70 for rising and falling in vertical direction in cooperation with horizontal movement of the horizontally operating rod 60 is provided, and top end of the vertically operating rod 70 is positioned at a journal portion 41 of recessed portion, i.e., upper portion of crank chamber in a state that the cylinder block 40 is supported on the sub-clamp 30.

And, a push rod 80 is provided horizontally at top end of the vertically operating rod 70 whereby the push rod 80 is moved in cooperation with a rising of the vertically operating rod 70 so as to fix by pressing an inner wall surface of the journal portion 41 of the cylinder block 40.

Further, the vertically operating rod 60 and the horizontally operating rod 70 are slidably reciprocated respectively in response to the guiding of cylindrically shaped guide member 11, 12, and upper portion of the vertically operating rod 70 protruded to upper portion of the base member 10 is protected by a housing 13 fixed by bolt on the base member 10.

Moreover, the push rod 80 is slidably guided by horizontally passing through the wall surface of the housing 13, and upper portion of the housing 13 is closed by a cover 14.

On the other hand, a bottom end portion of the vertically operating rod 70 and a contacting surface of the horizontally operating rod 60 supporting the bottom end portion thereof are formed of inclined taper surface 63, 71, so that in case of forward movement (upon moving to left side on the basis of shown state) of the horizontally operating rod 60, the vertically operating rod 70 is made to be risen by vertically pushing up, and a contacting surface of the vertically operating rod 70 and the push rod 80 are also formed of taper surface 72, 81, so that in case when the vertically operating rod 70 rises, the push rod 80 is pushed and pulled in horizontal direction whereby applying a pressure to the cylinder block 40 so as to be fixed.

Figure 2:
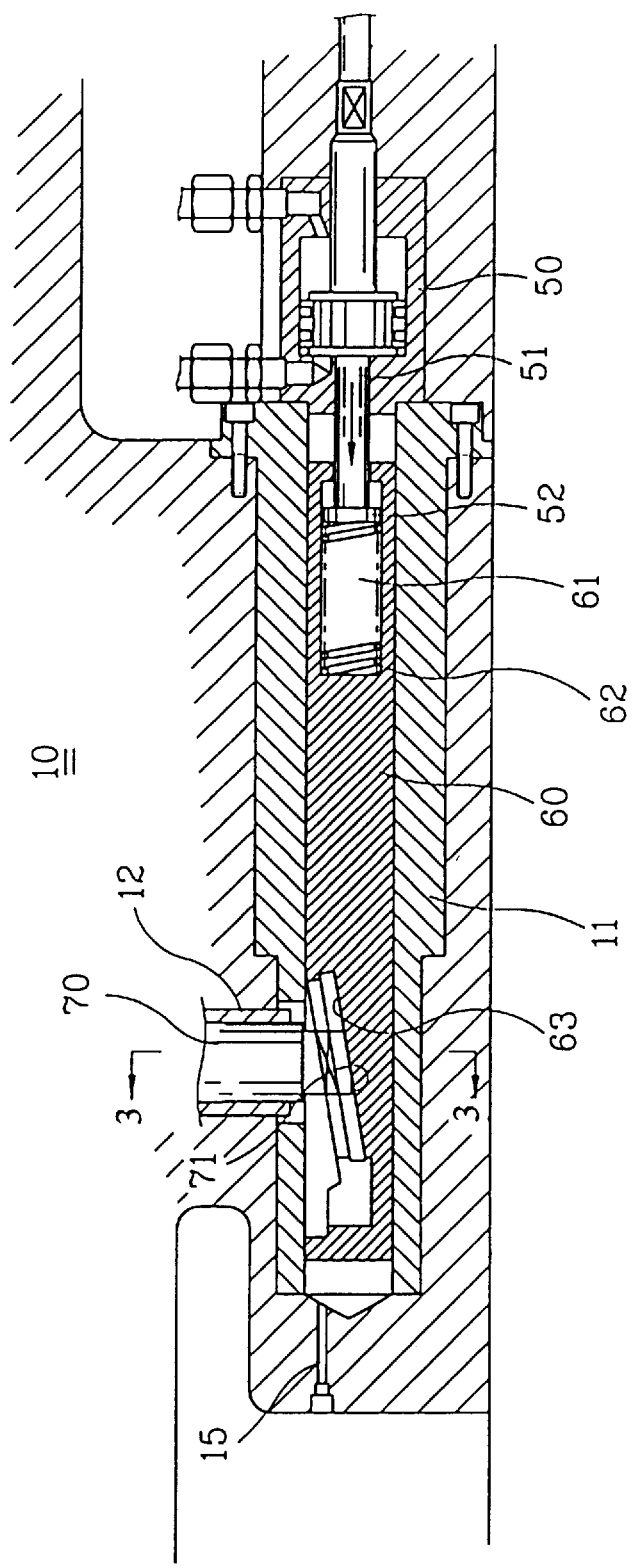
FIG. 2 is a magnified cross sectional view of major part of FIG. 1 of the present invention.

And, as shown in FIG. 2, it is possible to so construct that a spacial portion is formed at rear end portion of the horizontally operating rod 60, and a spring 62 is contained into interior thereof as a shock absorbing means so as to resiliently support a disc means 52 formed at an end portion of the piston rod 51 of the oil pressure cylinder 50, so that the horizontally operating rod 60 is advanced via the spring 62 whereby having a damping force, and on the other hand, a number of holes are formed to the disc portion 52 and an oil is filled to the spacial portion 52 so that in case when the disc portion 52 advances, a damping action is produced by an orifice function of the oil through holes so as to decrease a shocking power upon slidably moving of the horizontally operating rod 60.

Figure 3:
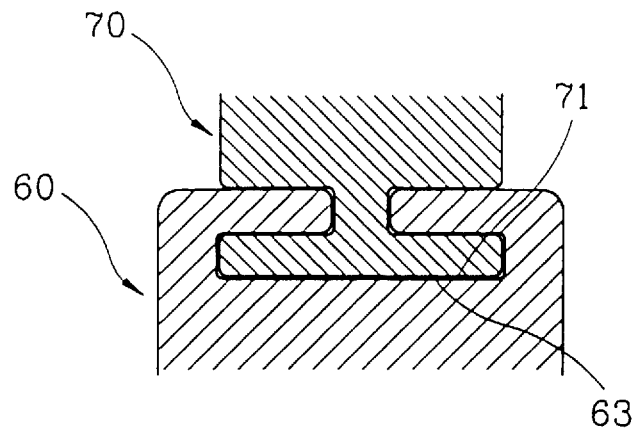
FIG. 3 is a fragmentary magnified cross sectional view taken along A—A line of FIG. 2.

And, it is further effective for a cooperative movement that each contacting end portion of the horizontally and vertically operating rod 60, 70 and the push rod 80 are made to form the taper surface 63, 71, 72, 81 being a shape to be confronted so as to have a predetermined slant angle one another, so as to be coupled in dove tail fashion one another as shown in FIG. 3.

On the other hand, in order to make the operation of the oil pressure cylinder 50 to be possible to stop at a predetermined time point, an operation of the oil pressure cylinder 50 is limited by providing a stopper 90 and a limit switch 100 for limiting an operating stroke, on a piston rod 51 extended to backward of the oil pressure cylinder 50.

Operation of the present invention constructed as above will be described more in detail as below.

In accordance with the present invention constructed as above, firstly a casted cylinder block 40 material is made to be automatically conveyed from a process line and then, when it is exactly set on the sub-clamp 30 of the base member 10 of the present invention, the material 40 is clamped by applying a force to vertical direction by the main clamp 20 and the sub-clamp 30.

When the oil pressure cylinder 50 is operated in a such fixed state, as shown in FIG. 2, the disc portion 52 of the piston rod 52 end portion advances and simultaneously becoming to push the spring 62, and successively the horizontally operating rod 60 becomes to advance by a resilient force of the spring 62.

By the way, a reason why it is constructed so as to make the horizontally operating rod 60 to be moved by means of shock absorbing means such as spring 62 as aforementioned is because in case the horizontally operating rod 60 is made to be directly moved by the piston rod 52, a problem could be occurred in which excessively high pressure would be directly operated to both sides of the inclined surface 62, 71 whereby the contacting portions are seized and thereby a restoration to original state becomes difficult, and an operating power exceeding a smooth sliding movement speed of both sides members 60, 70 is absorbed and buffed so that the seizure of the both sides inclined surface portion 62, 71 can be previously prevented.

When the oil is supplied and the cylinder 50 is operated whereby the horizontally operating rod 60 is advanced, a divided force is operated which becomes to push up the vertically operating rod 70 to upward in vertical direction by the taper surface 62, 71, and the vertically operating rod 70 raised in response to guide of the taper surface 62 becomes to operate again a divided force of horizontal direction to the push rod 80 contacting via the taper surface 72, 81, and thereby the push rod 80 is projected from the housing 13 and simultaneously the inner wall surface of the journal portion 41 of the cylinder block 40 is pressed and fixed.

Thus, the reason doing to be clamped to the journal portion by positioning the vertically operating rod 70 to inner side of crank chamber of the cylinder block 40 is for making to be possible to commonly use to various cylinder blocks which are different each other above all things, and which is because in case of clamping to outside of the cylinder block 40, since size of the cylinder block and exterior shape become different in response to the kind of vehicle, the fixing point should be changed according to exterior shape and therefore, contrary to separately providing a fixing clamp for preventing the trembling of thrust direction according to the material, since the journal portion 41 only has a little difference merely in diameter and the shape is always constant, if the clamping is executed at said journal portion 41, the clamping of all cylinder block is possible irrespective of size and exterior shape of the cylinder block.

On the other hand, when the front stopper is contacted to the limit switch 100 during the piston rod 51 is advancing in order to limit a pressure of the push rod 80 within a predetermined value, the oil pressure supplied to the oil pressure cylinder 50 is cut off whereby the cylinder 40 becomes fixed by a pressure at that state.

According to this, since the push rod 80 applies a force constantly in the thrust direction to the cylinder block 40 whereby making to be fixed, a trembling upon milling working becomes prevented.

EFFECT OF THE INVENTION

In accordance with the present invention as above, since the cylinder block 40 is clamped concurrently in thrust direction together with in vertical direction, a material trembling upon milling cutting working is prevented, and this has effects that it makes a fixing force of the cylinder block to be greatly increased so that the cutting working operation can be executed at further stable state and at the same time an efficiency of work can be improved, and more particularly there is effects that since the clamping can be done regardless of kind of engine, equipment cost is greatly decreased, and excessive compressing force to vertical direction can be decreased whereby deformation of the cylinder block is prevented.

What is claimed is:

1. In a clamping device for milling working of engine including a base member, a sub-clamp which is fixed on the base member and supports bottom surface of cylinder block, and a main-clamp fixing by pressing vertically from upward a cylinder block supported by the sub-clamp, a clamping device for milling working of engine comprising:

an oil pressure cylinder to be mounted to bottom or body's interior of said base member so that a piston rod is reciprocally moved in vertical direction;

a horizontally operating rod for slidably moving in horizontal direction by sad piston rod;

a vertically operating rod for rising in vertical direction by cooperatively moving therewith upon forwardly moving of said horizontally operating rod; and a push rod for fixing by applying a pressing power to a journal member of said cylinder block by slidably moving in horizontal direction upon rising of said horizontally operating rod by cooperatively moving therewith.

2. A clamping device for milling working of engine as defined in claim 1, wherein said contacting portion of the horizontally operating rod and the vertically operating rod and the contacting portion of the vertically operating rod and the push rod are formed of taper surface.

3. A clamping device for milling working of engine as defined in claim 1, wherein said vertically operating rod receives the force transferred via shock absorbing means from the piston rod.

4. A clamping device for milling working of engine as defined in claim 1, wherein said both sides members contacting by the taper surfaces are coupled by means of dove tail.

5. A clamping device for milling working of engine as defined in claim 1, wherein said operating stroke of the piston rod is limited by the limit switch.

\* \* \* \* \*

UNITED STATES PATENT AND TRADEMARK OFFICE
CERTIFICATE OF CORRECTION

PATENT NO. : 5,865,577
DATED : February 2, 1999
INVENTOR(S) : Byung-Gi Kim

It is certified that error appears in the above-identified patent and that said Letters Patent is hereby corrected as shown below:

Title page,
Please replace the entire specification with the following:

-- CLAMPING DEVICE FOR WORKING AN ENGINE
BACKGROUND OF THE INVENTION

Field of Invention

The present invention relates to a clamping device for working an engine, and more particularly, to a clamping device which prevents movement of a cylinder block in a thrust direction during rough or precise cutting of the front and rear surfaces of the cylinder block.

Description of the Related Art

Since the cylinder block of an engine is made of cast-iron, the block has a rough surface which requires post-working. The milling cutter used to roughly cut or precisely cut the front and rear surfaces of cylinder block causes strong shocks upon the cylinder block. A clamping device is necessary in order to firmly fix the cylinder block and avoid such shocks.

A conventional clamping device for fixing the cylinder block of an engine pushes the engine down in a vertical direction. Such a conventional clamping device is illustrated in Fig. 5 and includes a main clamp 20 pushing down on a cylinder block of an engine 40 that is mounted on a sub-claim 30.

In accordance with such a conventional clamping system, the engine is pressed and fixed only in a vertical direction. Such clamping is weak against milling cutting working pressure applied in a horizontal direction of the cylinder block, i.e. a thrust direction. Such a conventional clamping device also allows for vibrational problems when a large cutting force is applied.

Further, when the conventional clamping device applies a large pressure in the vertical direction, a deformation of the block may occur when the clamp is released.

Even further, the vibration resulting from a large cutting pressure applied to the cylinder block results in uneasiness to the operator and a loss of precision.

UNITED STATES PATENT AND TRADEMARK OFFICE
CERTIFICATE OF CORRECTION

PATENT NO. : 5,865,577
DATED : February 2, 1999
INVENTOR(S) : Byung-Gi Kim

It is certified that error appears in the above-identified patent and that said Letters Patent is hereby corrected as shown below:

OBJECT AND SUMMARY OF THE INVENTION

An object of the present invention includes providing a clamping device for working an engine which maintains a stable, vibration free working operation upon working a casted cylinder block.

Another object of the present invention includes providing a clamping device for working an engine which improves a working precision by preventing vibration of the cylinder block during working.

Still another object of the present invention includes providing a clamping device for working an engine which prevents deformation of the engine due to excessive claimping forces.

In order to attain the objects as above, an embodiment of the present invention includes a clamping device for working a cylinder block of an engine, the device including a base member, a sub-clamp which is fixed to the base member and supports a bottom surface of cylinder block. The embodiment of the invention further includes a main clamp pressing vertically down upon the cylinder block, and oil pressure cylinder mounted to a bottom or body interior of the base member, so that a piston rod reciprocates in a horizontal direction, a horizontal operating rod for sliding movement in a horizontal direction by the piston rod, a vertical operating rod for displacement in a vertical direction upon a forward movement of the horizontal operating rod, and a push rod slidable in a horizontal direction in response to a displacement of the vertical operating rod, wherein the push rod fixes the engine by applying a force to a journal member of the cylinder block.

BRIEF DESCRIPTION OF THE DRAWINGS

Figure 4:
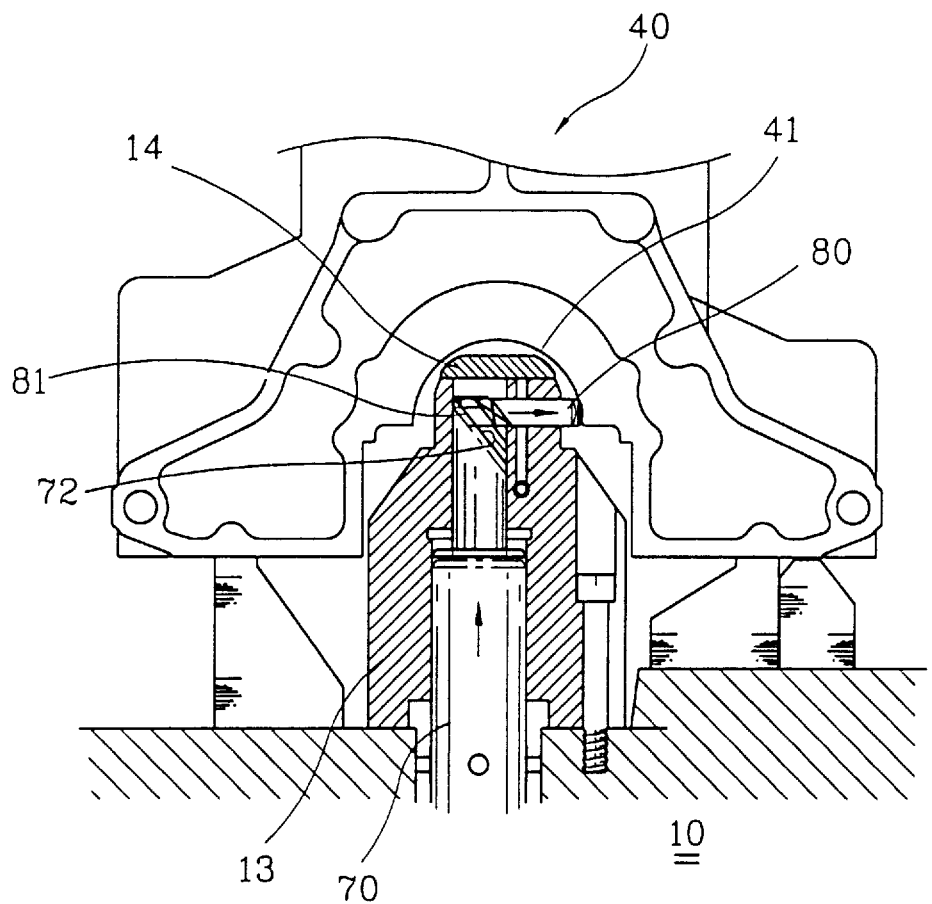
FIG. 4 is a cross sectional view of a push rod showing an operating structure in accordance with the present invention.

FIG. 1 illustrates a cross sectional view of a clamping device for working an engine according to an embodiment of the present invention, FIG. 2 illustrates an enlarged cross sectional view of the embodiment of FIG. 1, FIG. 3 illustrates a cross sectional view taken along 3-3 line of FIG. 2, FIG. 4 illustrates a cross sectional view of an embodiment of the present invention including a push rod, and FIG. 5 is a cross sectional view illustrating a convectional engine clamping technique.

UNITED STATES PATENT AND TRADEMARK OFFICE
CERTIFICATE OF CORRECTION

PATENT NO. : 5,865,577
DATED : February 2, 1999
INVENTOR(S) : Byung-Gi Kim

It is certified that error appears in the above-identified patent and that said Letters Patent is hereby corrected as shown below:

Detailed Description of the Preferred Embodiment

The preferred embodiment of the present invention will be described in more detail with reference to the accompanying drawings.

FIG. 1 illustrates a base member 10, a sub-clamp 30 for supporting both sides of a bottom surface of cylinder block 40, and a main clamp 20 for vertically fixing the cylinder block on the sub-clamp 30.

An oil pressure cylinder 50 is mounted at a bottom or within the base member 10. A horizontal operating rod 60 for horizontal sliding reciprocation is driven by the oil pressure cylinder 50. The horizontal operating rod cooperates with a piston rod 51 at an axial end. A vertical operating rod 70 for reciprocating in a vertical direction cooperates with the horizontal operating rod 60. A top end of the vertical operating rod 70 is positioned at a journal portion 41 of a recessed portion of the cylinder block, i.e. an upper portion of a crank chamber of the cylinder block.

A push rod 80 is provided horizontally adjacent a top end of the vertical operating rod 70, whereby the push rod 80 is displaced by cooperation with a reciprocation of the vertical operating rod 70. The push rod fixes the cylinder block by pressing an inner wall surface of a journal portion 41 of the cylinder block 40.

Further, the vertical operating rod 60 and the horizontal operating rod 70 are slidably reciprocated respectively within cylindrically shaped guiding members 11, 12. The upper portion of the vertical operating rod 70 protruding from an upper portion of the base member 10 is protected by a housing 13 which is fixed to the base member 10 by a bolt.

Moreover, the push rod 80 is slidably guided by horizontally passing through a wall surface of the housing 13. An upper portion of the housing 13 is closed by a cover 14.

A bottom end portion of the vertical operating rod 70, and a contacting surface of the horizontal operating rod 60 supporting the bottom end portion of the vertical operating rod 70, are formed of inclined tapered surfaces 63, 71. In the case of forward movement of the horizontal operating rod 60 (to the left in Fig. 1), the vertical operating rod 70 is driven upwardly. Contacting surfaces of the vertical operating rod 70 and the push rod 80 are also formed of taper surfaces 72, 81. When the vertical operating rod 70 rises, the push rod 80 is forced in a horizontal direction thereby applying a fixing pressure to the cylinder block 40.

FIG. 2 illustrates a spacial portion formed at rear end portion of the horizontal operating rod 60. A spring 62 is contained in the special portion to act as a shock absorbing means. The spring 62 resiliently supports a disc means 52 formed at an end portion of the piston rod 51 of the oil pressure cylinder 50 so that advancement of the horizontal operating rod 60 includes the damping force of the spring 62. A number of holes are formed in the disc means 52 so that when an oil is supplied to the spacial portion and the disc means 52 advances, a damping action is produced by an orifice function of the oil through the holes. Such an arrangement decreases a shocking power produced by the sliding movement of the horizontal operating rod 60.

UNITED STATES PATENT AND TRADEMARK OFFICE
CERTIFICATE OF CORRECTION

PATENT NO. : 5,865,577
DATED : February 2, 1999
INVENTOR(S) : Byung-Gi Kim

It is certified that error appears in the above-identified patent and that said Letters Patent is hereby corrected as shown below:

Each tapered end surface 63, 71, 72, 81 of the horizontal and vertical operating rods 60, 70 and the push rod 80 is formed to slide along its contacting surface at a predetermined slant angle and with a dovetail coupling, as shown in FIG. 3.

In order to control the extent of movement of the oil pressure cylinder 50, a stopper 90 and a limit switch 100 are provided for limiting the operating stroke of a piston rod 51 extending rearward of the oil pressure cylinder 50.

The operation of the present invention in accordance with the illustrated embodiment is as follows. First, a casted cylinder block 40 is conveyed from a process line and set on the sub-clamp 30 of the base member 10. The cylinder block 40 is then clamped by applying a vertical, downward force by the main clamp 20.

When the cylinder block is fixed on the sub-clamp 30, the oil pressure cylinder 50 is operated and the disc means 52 of the piston rod 52 end portion advances. The advancement of the disc means 52 urges and advancement of the spring 62 and, by the resilient force of the spring, advancement of the operating rod 60.

The movement of the horizontal operating rod 60 by the shock absorbing means, such as a spring 62, prevents seizure problems associated with excessively high pressures acting on both sides of the inclined surfaces 63, 71. Any operating power which exceeds a smooth sliding movement speed of the members 60, 70 is absorbed and buffed so that a seizure of the inclined surface portions 63, 71 can be prevented.

When oil is supplied to the cylinder 50, and the horizontal operating rod 60 is advanced, a divided force results. Movement of the horizontal operating rod 60 raises the vertical operating rod 70 by engagement of the taper surfaces 63, 71. Further, the vertical operating rod 70, which is raised in response to a guide of the taper surface 63, acts upon the push rod 80 via the taper surface 72, 81, to project the push rod 80 from the housing 13. Simultaneously, the inner wall surface of the journal portion 41 of the cylinder block 40 is pressed and fixed.

The reason for clamping the journal portion by positioning the vertical operating rod 70 to an inner side of crank chamber of the cylinder block 40 is to allow use of the clamping device of the present invention for various cylinder blocks. In devices utilizing a clamping to the outside of the cylinder block 40, size and shape differences of the cylinder blocks of different types of vehicles require different fixing points. Clamping of all cylinder blocks, irrespective of size or shape, is possible in accordance with the present embodiment since a journal portion 41 only varies slightly in diameter and shape among different cylinder blocks.

In order to limit a pressure of the push rod 80 within a predetermined value, the a front stopper 90 contacts the limit switch 100 during a piston rod 51 advancement and the oil pressure supplied to the oil pressure cylinder 50 is cut off, whereby the cylinder 40 becomes fixed by a pressure at that state.

Accordingly, vibration upon working of the cylinder block 40 is prevented when the push rod 80 applies a constant force in the thrust direction to fix the cylinder block 40.

UNITED STATES PATENT AND TRADEMARK OFFICE
CERTIFICATE OF CORRECTION

PATENT NO. : 5,865,577
DATED : February 2, 1999
INVENTOR(S) : Byung-Gi Kim

It is certified that error appears in the above-identified patent and that said Letters Patent is hereby corrected as shown below:

EFFECT OF THE INVENTION

In accordance with the present invention, vibration a cylinder block during milling cutting is prevented due to clamping in both the thrust and vertical direction. Such a clamping device also greatly increases a fixing force of the cylinder block so that the cutting working operation can be more stable and efficient. Further, the clamping device of the present invention reduces equipment costs by providing for a fixation regardless of the type of engine cylinder block. The present invention also avoids the problems of excessive compressing force in the vertical direction which can deform of the cylinder block.

What is claimed is:

1. In a clamping device for working an engine including a base member, a sub-clamp which is fixed on the base member and supports a bottom surface of a cylinder block, and a main-clamp for fixing by vertically pressing downward upon the cylinder block supported by the sub-clamp, the clamping device comprising:
an oil pressure cylinder mounted to at least one of a bottom and body interior of said base member so that a piston rod is reciprocally moved in a horizontal direction;
a horizontal operating rod for slidably moving in a horizontal direction by said piston rod;
a vertical operating rod for rising in a vertical direction by cooperatively moving upon a forward movement of said horizontal operating rod; and
a push rod slidably moving in a horizontal direction due to a cooperative rising of said horizontal operating rod, whereby the push rod fixes the cylinder block by applying a pressing power to a journal member of said cylinder block.

2. A clamping device for working an engine as defined in claim 1, wherein a contacting portion of the horizontal operating rod and vertical operating rod, and a contacting portion of the vertical operating rod and the push rod are all formed by mating tapered surfaces.

3. A clamping device for working an engine as defined in claim 1, wherein said vertical operating rod receives a force transfer from the piston rod by shock absorbing means.

4. A clamping device for milling working of engine as defined in claim 2, wherein the contating portions are coupled by means of a dove tail configuration.

5. A clamping device for working an engine as defined in claim 1, wherein an operating stroke of the piston rod is limited by a limit switch.

UNITED STATES PATENT AND TRADEMARK OFFICE
CERTIFICATE OF CORRECTION

PATENT NO. : 5,865,577
DATED : February 2, 1999
INVENTOR(S) : Byung-Gi Kim

It is certified that error appears in the above-identified patent and that said Letters Patent is hereby corrected as shown below:

ABSTRACT

A clamping device for working an engine provides a fixing of a cylinder block which reduces vibration upon milling working, improves a working precision, and prevents deformation of the block by dispersing excessive clamping forces. An embodiment of the invention includes a base member, a sub-clamp which is fixed on the base member and supports a bottom surface of the cylinder block, a main-clamp fixing by vertically pressing downward upon the cylinder block. An embodiment of the invention further includes an oil pressure cylinder to mounted to a bottom or body interior of the base member so that a piston rod is reciprocally moved in horizontal direction, a horizontal operating rod for slidably moving in horizontal direction by the piston rod, a vertical operating rod for rising in vertical direction by cooperatively moving with the horizontal operating rod upon forwardly movement of the horizontal operating rod, and a push rod slidably moving a horizontal direction due to a cooperative rising of the horizontal operating rod, whereby the push rod fixes the cylinder block by applying a pressing power to a journal portion of the cylinder block. --.

Signed and Sealed this

Nineteenth Day of March, 2002

Attest:

JAMES E. ROGAN
Director of the United States Patent and Trademark Office

Attesting Officer